(12) United States Patent
Zhang et al.

(10) Patent No.: US 10,397,108 B2
(45) Date of Patent: Aug. 27, 2019

(54) SERVICE FUNCTION CHAINING ACROSS MULTIPLE SUBNETWORKS

(71) Applicant: Futurewei Technologies, Inc., Plano, TX (US)

(72) Inventors: Hong Zhang, Santa Clara, CA (US); Fei Rao, Santa Clara, CA (US); Henry Louis Fourie, Santa Clara, CA (US); Farhad P. Sunavala, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 192 days.

(21) Appl. No.: 15/412,282

(22) Filed: Jan. 23, 2017

(65) Prior Publication Data

US 2017/0214613 A1     Jul. 27, 2017

Related U.S. Application Data

(60) Provisional application No. 62/286,893, filed on Jan. 25, 2016.

(51) Int. Cl.
*H04L 12/741* (2013.01)
*H04L 12/46* (2006.01)
*H04L 29/12* (2006.01)

(52) U.S. Cl.
CPC .......... *H04L 45/74* (2013.01); *H04L 12/4633* (2013.01); *H04L 12/4641* (2013.01); *H04L 61/103* (2013.01); *H04L 61/6022* (2013.01)

(58) Field of Classification Search
None
See application file for complete search history.

(56) References Cited

U.S. PATENT DOCUMENTS

| 9,853,898 B1 * | 12/2017 | Subramanian ........ H04L 45/745 |
| 2014/0233569 A1 * | 8/2014 | Yong ....................... H04L 45/64 370/392 |

(Continued)

FOREIGN PATENT DOCUMENTS

| CN | 104283806 A | 1/2015 |
| CN | 105227498 A | 1/2016 |

(Continued)

OTHER PUBLICATIONS

Srivastava Piyush Kaman et al:, Networking agent for overlay L2 routing and overlay to underlay external networks L3 routing using OpenFlow and Open vSwitch, 2015 17th Asia-Pacific Network Operations and Management Symposium (APNOMS), IEICE Aug. 19, 2015, XP033218204, 6 pages.

(Continued)

*Primary Examiner* — Kwang B Yao
*Assistant Examiner* — Juvena W Lee
(74) *Attorney, Agent, or Firm* — Futurewei Technologies, Inc.

(57) ABSTRACT

A method for service function chaining across subnetworks includes receiving a packet at a virtual switch integration bridge from a first service function (SF) that is in a service function chain (SFC) and that is on a first subnetwork, determining a next SF in the SFC in a different subnetwork, and sending the received packet directly from the virtual switch integration bridge to the next SF.

12 Claims, 8 Drawing Sheets

(56) References Cited

U.S. PATENT DOCUMENTS

| | | | | |
|---|---|---|---|---|
| 2014/0307744 | A1* | 10/2014 | Dunbar | H04L 45/44 370/401 |
| 2015/0195197 | A1 | 7/2015 | Yong et al. | |
| 2015/0236948 | A1 | 8/2015 | Dunbar et al. | |
| 2015/0381485 | A1 | 12/2015 | He et al. | |
| 2016/0134531 | A1* | 5/2016 | Assarpour | H04L 45/74 370/392 |
| 2016/0165014 | A1* | 6/2016 | Nainar | H04L 69/22 370/392 |
| 2018/0152414 | A1* | 5/2018 | Ao | H04L 12/66 |
| 2018/0198643 | A1* | 7/2018 | Ao | H04L 12/46 |

FOREIGN PATENT DOCUMENTS

| | | |
|---|---|---|
| EP | 2963866 A2 | 1/2016 |
| WO | 2015080634 A1 | 6/2015 |

OTHER PUBLICATIONS

Zhang L Fourie Huawei R Parker Affirmed Networks M Zarny Goldman Sachs H:: "Service Chain Header; draft-zhang-sfc-sch-03.txt", Service Chain Header;draft-zhang-sfcsch-03.txt, Internetengineering Task Force, IETF; Standardworkingdraft, Internet Society (ISOC) 4, Rue Des Falaises CH-1205, Geneva,Switzerland, Dec. 24, 2014, XP015103723. 18 pages.

Fernando Cisco S Mackie Juniper D Rao Cisco B Rijsman Juniper M Napierala ATandT Morin Orange R:"Service Chaining using Virtual Networks with BGP VPNs; draft—fm-bess-service-chaining-02.txt", Service Chaining Using Virtual Networks With BGP VPNs;draft-fm-bess-servi ce-chaining-02.txt, Internet Engineering Task Force IETF; Standardworkingdraft, Internet society4, Rue Des Falaises CH-1205, Switzerland, Dec. 8, 2015,XP015110142, 42 pages.

\* cited by examiner

SERVICE FUNCTION CHAINING ACROSS MULTIPLE SUBNETWORKS

CROSS-REFERENCE TO RELATED APPLICATION

This application claims the benefit of U.S. Provisional Application No. 62/286,893, filed on Jan. 25, 2016, entitled "Service Function Chaining Across Multiple Subnetworks Using Virtual Switch Router Bypass," which application is hereby incorporated herein by reference.

TECHNICAL FIELD

The present invention relates generally to a system and method for handling data in a service function chain, and, in particular embodiments, to a system and method for bypassing virtual routers when transferring data packets between service functions in a service chain.

BACKGROUND

Service chaining is being widely adopted in a networking industry as a means of dynamically creating a sequence of virtual service functions (SFs) that can be applied to a traffic stream in a virtual network environment. In the virtual network environment, each virtual service function may be deployed on one of many physical nodes in a data center. A service chain may be created that specifies a sequence of port pairs, each having an ingress port and an egress port of a service function. Each node has a hypervisor that hosts virtual machines (VMs) on which the service functions are implemented, and also a virtual switch that steers traffic to each VM.

There may be cases where the service functions are deployed on different sub-networks. In the virtual network environment, these sub-networks are inter-connected using virtual routers.

SUMMARY

This specification describes a network device, method and system to increase traffic throughput for service chains.

In one embodiment, a network device includes one or more processors, and a non-transitory computer readable medium connected to the one or more processor and having stored thereon instructions that, when executed by the one or more processors, cause the network device to receive a packet at a virtual switch integration bridge from a service function (SF) that is in a service function chain (SFC) and that is on a first subnetwork, determine a next SF in the SFC, wherein the next SF is on a second subnetwork, change a destination media access control (MAC) address of the packet to a MAC address of the next SF and a virtual network identifier (VNI) of the first subnetwork in the packet to a VNI of the second subnetwork, and send the changed packet directly from the virtual switch integration bridge to the next SF.

In some embodiments, the non-transitory computer readable medium further has stored thereon instructions that, when executed by the one or more processors, cause the network device to track ports connected to the virtual switch integration bridge, and add a switch rule to the virtual switch integration bridge, the switch rule instructing the virtual switch integration bridge to steer the changed packet from an egress port of the SF to an ingress port of the next SF.

In another embodiment, a network device includes one or more processors, and a non-transitory computer readable medium connected to the one or more processor and having stored thereon instructions that, when executed by the one or more processors, cause the network device to receive a packet at a virtual switch integration bridge from a source virtual machine (VM) that is on a first subnetwork, determine a service function (SF) that is on a second subnetwork, change a destination media access control (MAC) address of the packet to a MAC address of the SF and a virtual network identifier (VNI) of the first subnetwork in the packet to a VNI of the second subnetwork, and send the changed packet directly from the virtual switch integration bridge to the SF.

In some embodiments, the non-transitory computer readable medium further has stored thereon instructions that, when executed by the one or more processors, cause the network device to track ports connected to the virtual switch integration bridge, and add a switch rule to the virtual switch integration bridge, wherein the switch rule is used to instruct the virtual switch integration bridge to steer the changed packet from an egress port of the source VM to an ingress port of the SF. The switch rule is further used to instruct the virtual switch integration bridge to change a source MAC address of the packet to a MAC address of an interface of a virtual router on the second subnetwork.

In another embodiment, a method includes receiving a packet at a virtual switch integration bridge from a first service function (SF) that is in a service function chain (SFC) and that is on a first subnetwork, determining a next SF in the SFC, wherein the next SF is on a second subnetwork, changing a destination media access control (MAC) address of the packet to a MAC address of the next SF and a virtual network identifier (VNI) of the first subnetwork in the packet to a VNI of the second subnetwork, and sending the changed packets directly from the virtual switch integration bridge to the next SF.

In another embodiment, a method includes receiving a packet at a virtual switch integration bridge from a source virtual machine (VM) that is on a first subnetwork, determining a service function (SF) that is on a second subnetwork, changing a destination media access control (MAC) address of the packet to a MAC address of the SF and a virtual network identifier (VNI) of the first subnetwork in the packet to a VNI of the second subnetwork, and sending the changed packet directly from the virtual switch integration bridge to the SF.

In accordance with some embodiments, a network system includes a first subnetwork having a first service function (SF) in a service function chain (SFC), a second subnetwork having a next SF in the SFC; and a virtual switch integration bridge connected to the first subnetwork and to the second subnetwork. The virtual switch integration bridge is configured to receive a packet from the first SF and determine the next SF in the SFC, send the received packet directly to the next SF in accordance with one or more switch rules.

As such, service chain traffic can bypass the virtual router and be sent directly from one SF to a next SF, or be sent directly from a VM to an SF. Thus, the network device, method and system increase traffic throughput for service chains.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below.

Subnetworks (also called as subnets) are usually interconnected using virtual routers in a virtual network environment. Service functions are hosted on compute nodes and virtual routers are typically implemented on a separate network node. Traffic in the service chain has to be sent to a network node to reach a virtual router and then back to the compute node on which a next service function resides.

Figure 1:
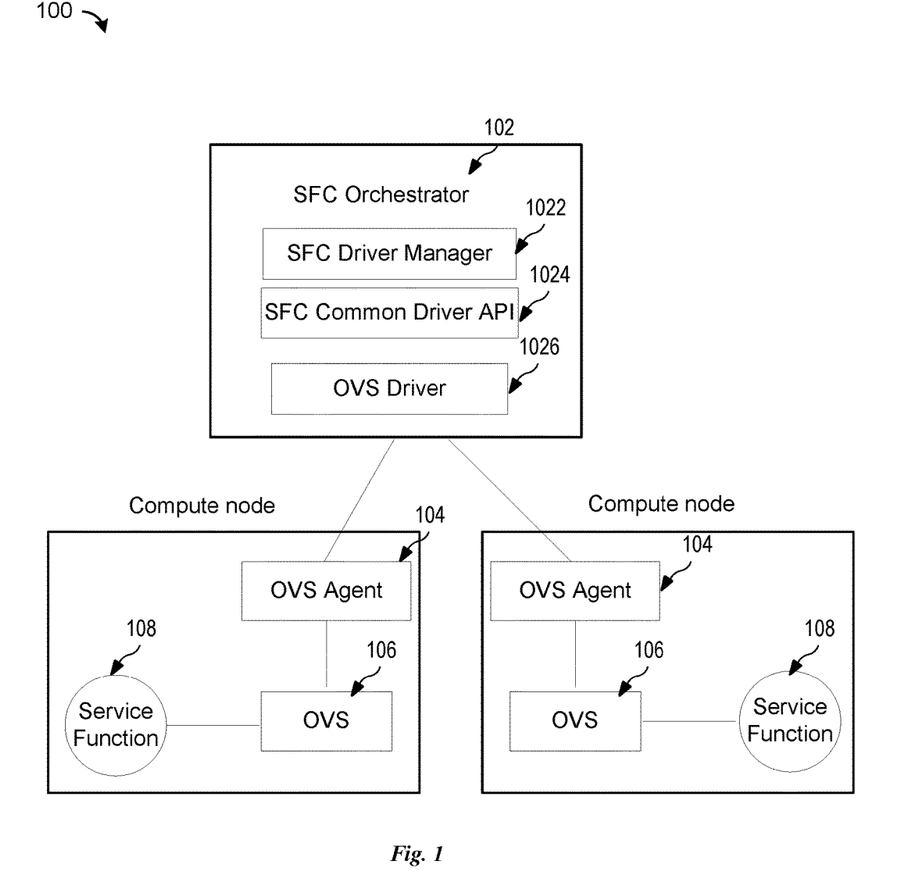
FIG. 1 is a logical diagram illustrating a service function chain (SFC) orchestrator and OVS agents in accordance with some embodiments.

FIG. 1 is a logical diagram illustrating a service function chain (SFC) orchestrator 102, open virtual switch (OVS) agents 104, and open virtual switches (OVS) 106. An SFC orchestrator 102 may include an SFC Driver Manager 1022, an SFC Common Driver Application program interface (API) 1024, and an OVS Driver 1026. The SFC orchestrator 102 creates the SFC and communicates with OVS agents 104 that reside on each compute node on which service functions exist. Virtual switches 106 are programmed with flow rules (also called switch rules, or OVS rules) to steer packets to ingress ports and from egress ports of the service functions that make up a service chain. An OVS 106 is widely used in the virtual networking datacenters as a virtual switch. The service functions are connected to the OVS 106. The OVS agent 104 installs the flow rules on the OVS 106 to steer the traffic to each service function in the SFC.

Figure 2:
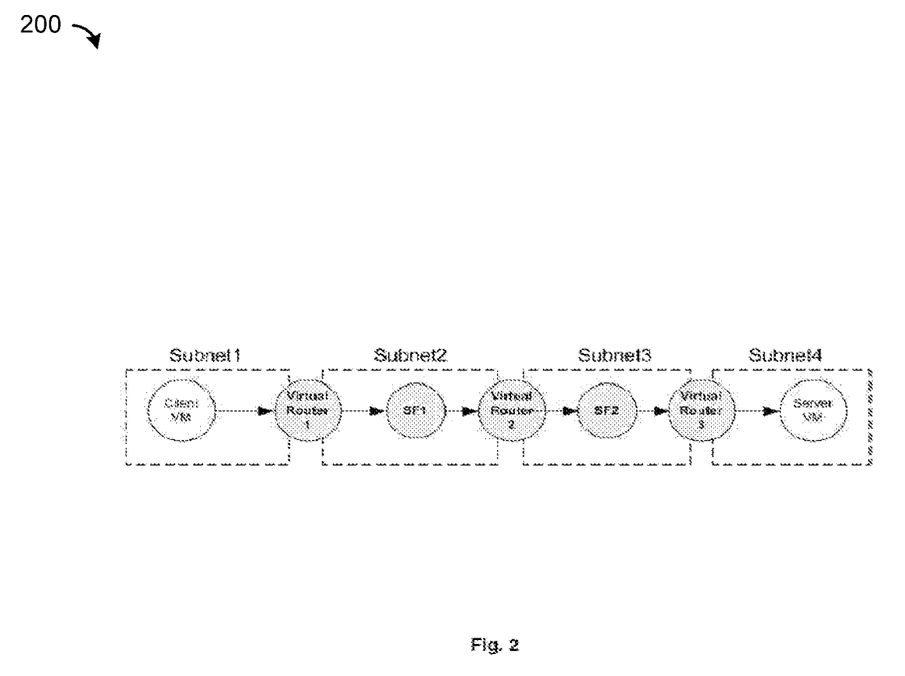
FIG. 2 a logical diagram illustrating an SFC with two service functions that span four subnetworks using three virtual routers in accordance with some embodiments.

FIG. 2 is a logical diagram illustrating an SFC with two service functions that span four subnetworks using three virtual routers. Service chain traffic is routed between service functions in different subnetworks via virtual routers. Thus, an SFC with two service functions that span four subnetworks transits three virtual routers, with a first virtual router between the client virtual machine (VM) and the first service function SF1, a second virtual router between the first service function SF1 and a second service function SF2, and a third virtual router between the second service function SF2 and the server VM.

Figure 3:
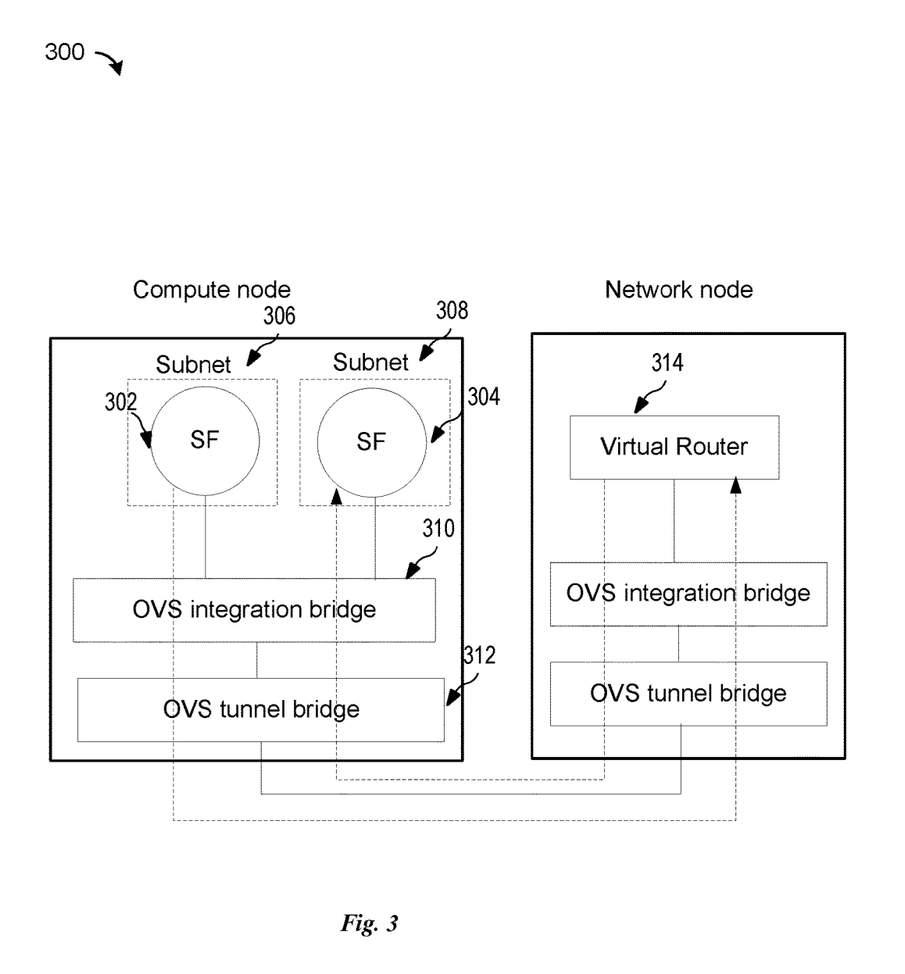
FIG. 3 is a logical diagram illustrating service chain traffic routed between service functions in different subnetworks via a virtual router in accordance with some embodiments.

FIG. 3 is a logical diagram illustrating service chain traffic routed between service functions in different subnetworks via a virtual router. The service functions are attached to the OVS integration bridge which steers the service chain traffic from one service function to the next service function in the SFC. Service chain traffic is routed between service functions in different subnetworks via a virtual router.

A packet from a first SF 302 is sent to an open virtual switch (OVS) integration bridge 310 which determines that the next SF 304 is one different subnetwork and so it sends the packet to a tunnel bridge 312 for transport via a virtual extensible LAN (VxLAN) or generic routing encapsulation (GRE) tunnel to the network node that hosts a virtual router 314. The virtual router 314 routes the packet to the next SF 304 in the next subnetwork 308 and delivers the packet to the next SF 304. In addition, if there are more than two subnetworks, the virtual routers are programmed to steer chain traffic to the correct subnetwork. This causes additional delay and results in a potential bottleneck on the network node.

An OVS integration bridge according to some embodiments avoids steering service chain traffic through a virtual router when the service functions exist on multiple subnetworks. In some embodiments, the OVS integration bridge may bypass virtual routers when the service functions of a service chain are deployed on separate subnetworks. In such an embodiment, traffic passing between service functions on different subnetworks will not transit a virtual router. Using the OVS integration bridge, service chain traffic can bypass the virtual router and be sent directly from one SF to a next SF, or be sent directly from a VM to an SF. Thus, the OVS integration bridge avoids having to add complex SFC steering functionality on the virtual routers, increases traffic throughput for service chains, decreases traffic latency through service chains, avoids bottlenecks at the nodes that host the virtual routers, and effectively distributes traffic load to multiple nodes in the network rather than on a single node.

Packets arriving at the service function ports in the next downstream subnetwork will appear to originate from a virtual router that connects the upstream subnetwork with the downstream subnetwork. The source Ethernet address or media access control (MAC) address of packets sent into the downstream subnetwork must be that of the Ethernet address of the egress interface that connects the virtual router to the downstream subnetwork. Packets are tagged to ensure the isolation of different tenant virtual networks. In addition in some embodiments, packets are steered over tunnels that interconnect the different physical nodes in a datacenter.

Traffic is steered using flow rules or switch rules installed on L2 forwarding bridges on the OVS. In some embodiments, the inter-subnetwork routing is performed on virtual routers implemented in Linux namespaces. The OVS flow rules control the operations of the router bypass.

Figure 4:
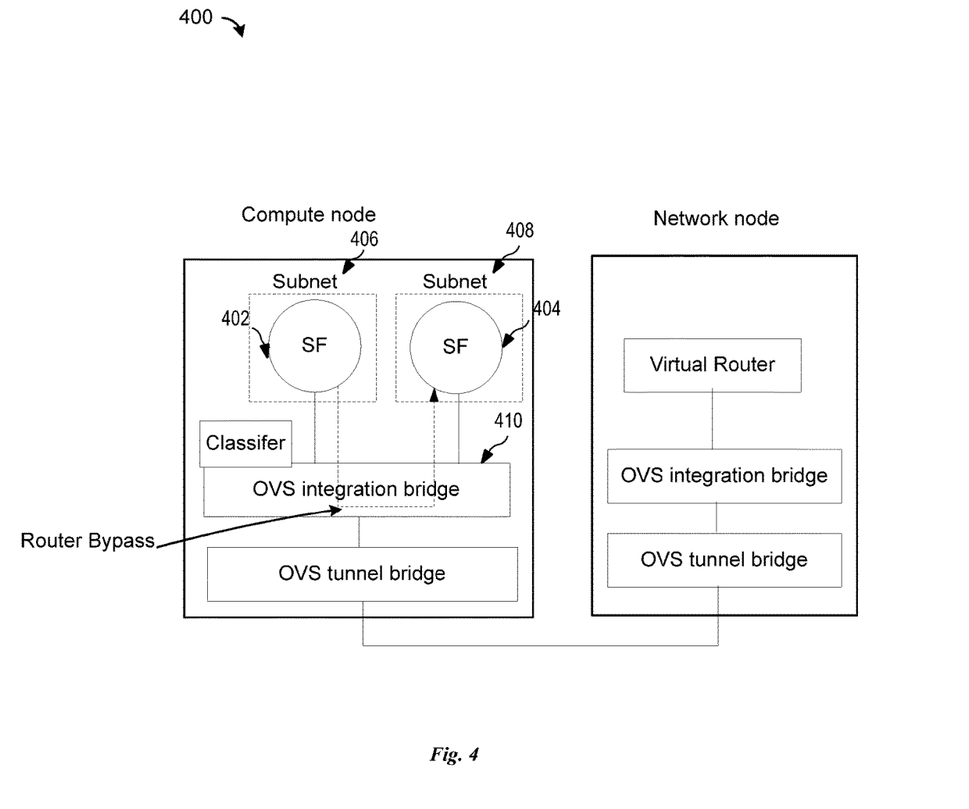
FIG. 4 is a logical diagram illustrating a router bypass steering traffic directly from one service function to a next service function in another subnetwork in accordance with some embodiments.

FIG. 4 is a logical diagram illustrating a router bypass steering traffic directly from a service function (for example, SF1) to a next service function (for example, SF2) in another subnetwork in accordance with some embodiments. Router bypass allows traffic to be steered directly from one service function to the next service function in another subnetwork without the need to transit a virtual router. The router bypass may be used in conjunction with a virtual router, with the virtual router routing packets to subnetworks that are outside of an OVS integration bridge. Packets from a first SF are sent to the OVS integration bridge which determines that the next SF is on a different subnetwork and so it sends the packet directly to the next SF. First SF and second SF may be hosted on the same compute node, or on different compute nodes, which is not limited in the embodiments.

The OVS agent track ports connected to the virtual switch integration bridge so the OVS agent has knowledge of all ports connecting the service functions to the OVS integration bridge. The OVS agent is able to add the OVS rules to the integration bridge to steer the packets from the egress port of one SF directly to the ingress port of the next SF. The OVS rules installed on the integration bridge set the source Ethernet address of the packets so that they appear to originate from the virtual router. Once the SFC traffic exits the last SF of the chain, normal routing via virtual routers is then used to deliver the traffic to its final destination.

For example, a source VM which needs to send traffic to a destination VM via service functions SF 402 and SF 404. SF 402 is on the first subnetwork 1.1.1.0/24 406 with virtual network identifier (VNI) 10. SF 402 has IP address 1.1.1.10/32 and MAC address MAC-SF1. SF 404 is on the second subnetwork 1.1.2.0/24 408 with VNI 20. SF 404 has IP address 1.1.2.10/32 and MAC address MAC-SF2. The destination VM is on the third subnetwork 1.1.3.0/24 with VNI 30. The destination VM has IP address 1.1.3.10 and MAC address MAC-VM. MAR-VR1 may represent a MAC address of an interface of a virtual router on subnetwork 1.1.1.0/24 (also called a virtual router MAC address of subnetwork 1.1.1.0/24, or a MAC address of a virtual router interface of subnetwork 1.1.1.0/24). MAC-VR2 may represent a MAC address of an interface of a virtual router on subnetwork 1.1.2.0/24 (also called a virtual router MAC address of subnetwork 1.1.2.0/24, or a MAC address of a virtual router interface of subnetwork 1.1.2.0/24), and MAC-VR3 may represent a MAC address of an interface of a virtual router on subnetwork 1.1.3.0/24 (also called a virtual router MAC address of subnetwork 1.1.3.0/24, or a MAC address of a virtual router interface of subnetwork 1.1.3.0/24).

(1) A packet from the source VM reaches the first SF 402. The first SF 402 receives the packet, and performs the function on it. The first SF 402 then sends the packet back to an OVS integration bridge 410 of the first subnetwork 406. Destination MAC address of the packet includes MAC-VR1, and destination IP address of the packet includes 1.1.3.10.

(2) The OVS integration bridge 410 receives the packet. The OVS integration bridge 410 queries a locally stored OVS rule, and gets the knowledge that the packet has to transit the second SF 404. OVS rules are obtained from an OVS agent. The OVS integration bridge 410 changes destination MAC (DestMAC) from MAC-VR1 to MAC-SF2, VNI from 10 to 20, and source MAC from MAC-SF1 to MAC-VR2. Then the OVS integration bridge 410 sends the changed packet to the second SF 404 directly to by-pass a virtual router.

(3) The second SF 404 receives the changed packet, and performs the function on it. The second SF 404 then sends a packet back to the OVS integration bridge 410.

(4) The OVS integration bridge 410 then sends the packet to the destination VM. Since there is no more service function in the path, the OVS integration bridge 410 sends the packet to the virtual router residing in the network node. The virtual router then routes the packets to the destination VM. If there is other service function in the service function chain, the OVS integration bridge 1 sends the packet to another service function.

A process in which destination VM sends an IP packet to source VM is similar to the foregoing process, and is not described in detail again.

Figure 5:
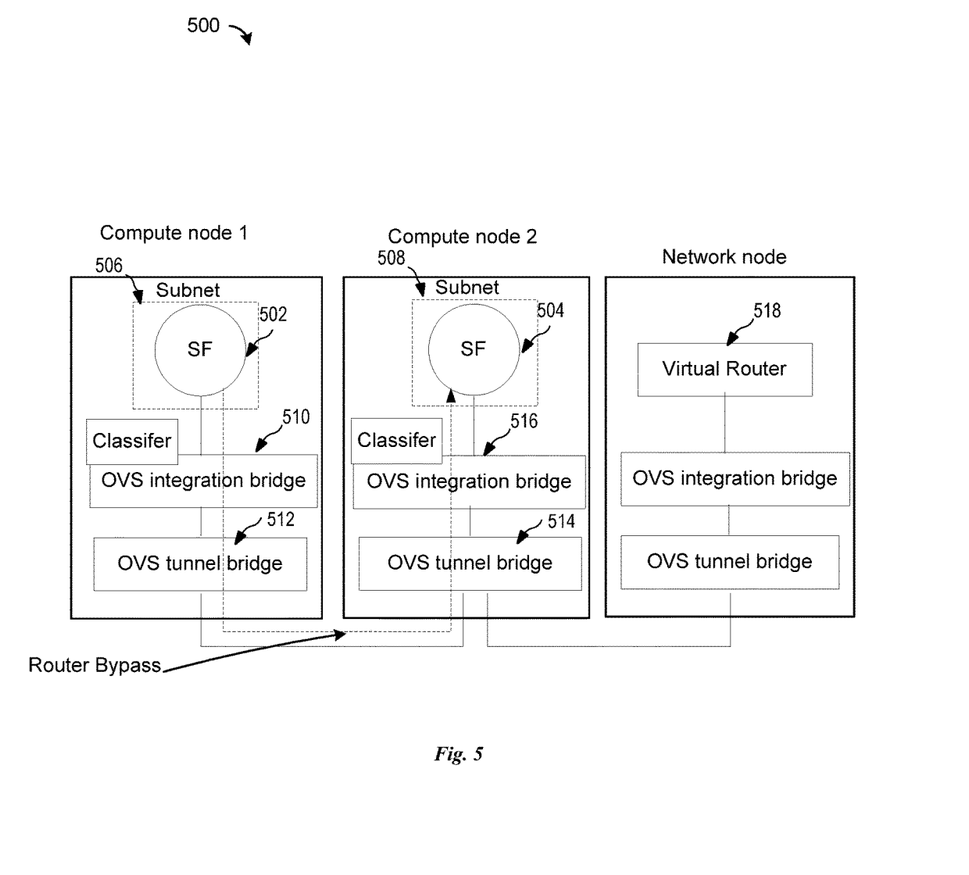
FIG. 5 is a logical diagram illustrating a router bypass steering traffic directly from one service function (SF) to a next service function in another subnetwork with the next SF hosted on a separate compute node in accordance with some embodiments.

FIG. 5 is a logical diagram illustrating a router bypass steering the traffic from an ingress classifier of a first SF to a second SF of an SFC in the case where the first SF and the second SF are on different subnetworks in accordance with some embodiments. An application scenario in FIG. 5 is similar to that in the embodiment shown in FIG. 4 except that the first SF and the second SF are hosted on different compute nodes in FIG. 5. The following describes an interaction process in detail. A classifier may classify network traffic based on one or more inputs, such as input port, source MAC address, destination MAC address, source IP address, destination IP address, protocol (TCP, UDP, etc.), Layer 4 (L4) source port, and/or L4 destination port, etc.

(1) For example, a source VM which needs to send traffic to a destination VM via service functions 502 and 504. A packet from the source VM reaches the first SF 502. The first SF 502 receives the packet, and performs the function on it. The first SF 502 then sends the packet to an OVS integration bridge 510 of the first subnetwork 506. Destination MAC address of the packet includes MAC-VR1, and destination IP address of the packet includes 1.1.3.10.

(2) The OVS integration bridge 510 receives the packet. The OVS integration bridge 510 queries a locally stored OVS rule, and gets the knowledge that the packet has to transit the second SF 504. The OVS rules are obtained from an OVS agent. The OVS integration bridge 510 changes destination MAC (DestMAC) from MAC-VR1 to MAC-SF2, VNI from 10 to 20, and source MAC from MAC-SF1 to MAC-VR2. Then the OVS integration bridge 510 sends the changed packet to an OVS tunnel bridge 512 of the first subnetwork.

(3) The OVS tunnel bridge 512 sends the changed packet using VxLAN encapsulation of the IP packet to an OVS Tunnel bridge 514 of the second subnetwork 508 directly to by-pass a virtual router 518.

(4) The OVS tunnel bridge 514 sends the changed packet to the second SF 504 via an OVS integration bridge 516 of the second subnetwork.

(5) The second SF 504 receives the changed packet, and performs the function on it. The second SF 504 then sends a packet back to the OVS integration bridge 516.

(6) The OVS integration bridge 516 then sends the packet to the destination VM. Since there is no more service function in the path, the OVS integration bridge 516 sends the packet to the virtual router 518 residing in the network node. The virtual router 518 then routes the packets to the destination VM. If there is other service function in the service function chain, the OVS integration bridge 516 sends the packet to another service function.

A process in which destination VM sends an IP packet to source VM is similar to the foregoing process, and is not described in detail again.

Figure 6:
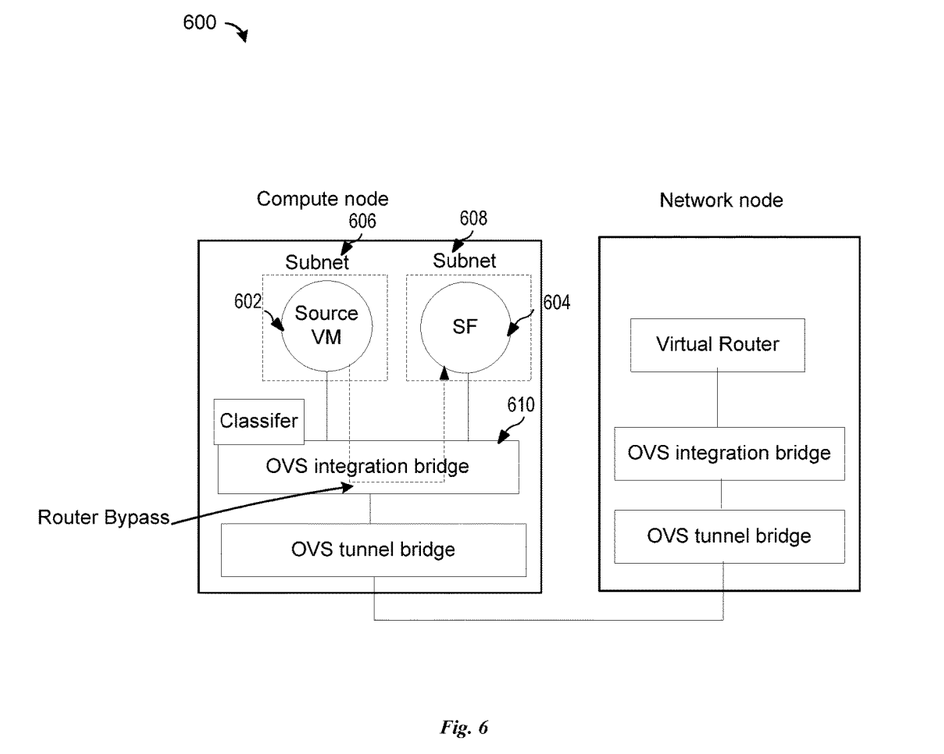
FIG. 6 is a logical diagram illustrating a router bypass steering traffic from an ingress classifier of an SFC to a first SF of the SFC in the case where a source VM and the first SF are on different subnetworks in accordance with some embodiments.

FIG. 6 is a logical diagram illustrating a router bypass steering the traffic from an ingress classifier of source VM to a first SF of an SFC in the case where the source VM and the first SF are on different subnetworks in accordance with some embodiments. Router bypass can be used for steering the traffic from an ingress classifier of a VM to a first SF of an SFC in the case where the source VM and the first SF are on different subnetworks. Once the SFC traffic exits the last SF of the chain, normal routing via virtual routers is then used to deliver the traffic to its final destination. Source VM and the first SF may be hosted on a compute node, or on different compute nodes, which is not limited in the embodiments.

Communication between VMs according to an embodiment is described below. For example, a source VM which needs to send traffic to a destination VM via service function SF. Source VM is on the first subnetwork 1.1.1.0/24 with VNI (virtual network identifier) 10. Source VM has IP address 1.1.1.10/32 and MAC address MAC-SRC. SF is on the second subnetwork 1.1.2.0/24 with VNI 20. SF has IP address 1.1.2.10/32 and MAC address MAC-SF. The destination VM is on the third subnetwork 1.1.3.0/24 with VNI 30. The destination VM has IP address 1.1.3.10 and MAC address MAC-DST. MAC-VR1 may represent a MAC address of an interface of a virtual router on subnetwork 1.1.1.0/24 (also called a virtual router MAC address of subnetwork 1.1.1.0/24, or a MAC address of a virtual router interface of subnetwork 1.1.1.0/24). MAC-VR2 may represent a MAC address of an interface of a virtual router on subnetwork 1.1.2.0/24 (also called a virtual router MAC address of subnetwork 1.1.2.0/24, or a MAC address of a virtual router interface of subnetwork 1.1.2.0/24), and MAC-VR3 may represent a MAC address of an interface of a virtual router on subnetwork 1.1.3.0/24 (also called a virtual router MAC address of subnetwork 1.1.3.0/24, or a MAC address of a virtual router interface of subnetwork 1.1.3.0/24).

(1) Source VM needs to communicate with destination VM. A packet from the source VM 602 reaches an OVS integration bridge 610 of the first subnetwork 606. Destination MAC address of the packet includes MAC-VR1, and destination IP address of the packet includes 1.1.3.10.

(2) The OVS integration bridge 610 receives the packet. The OVS integration bridge 610 queries a locally stored OVS rule, and gets the knowledge that the packet has to transit a service function 604. The OVS rules are obtained from an OVS agent. The OVS integration bridge 610 changes, the destination MAC (DestMAC) from MAC-VR1 to MAC-SF, VNI from 10 to 20, and source MAC from MAC-SRC to MAC-VR2. Then the OVS integration bridge 610 sends the changed packet to the service function 604 directly to by-pass a virtual router.

(3) The service function 604 receives the changed packet and performs the function on it. The service function 604 then sends a packet back to the OVS integration bridge 610.

(4) The OVS integration bridge 610 then sends the packet to the destination VM. Since there is no more service function in the path, the OVS integration bridge 610 sends the packet to the virtual router residing in the network node. The virtual router then routes the packets to the destination VM. If there is other service function in the service function chain, the OVS integration bridge 610 sends the packet to another service function.

A process in which destination VM sends an IP packet to source VM is similar to the foregoing process, and is not described in detail again.

Figure 7:
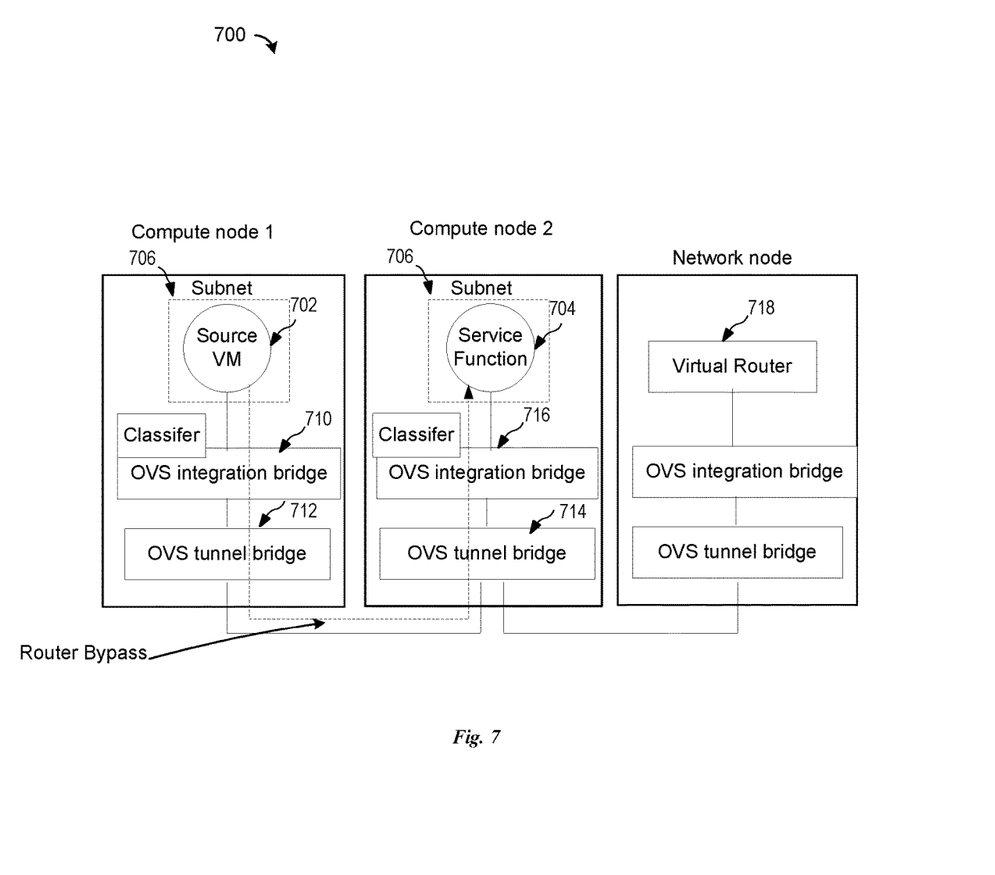
FIG. 7 is a logical diagram illustrating a router bypass steering traffic from an ingress classifier of an SFC to a first SF of the SFC in the case where a source VM and the first SF are on different subnetworks with the first SF hosted on a separate compute node in accordance with some embodiments.

FIG. 7 is a logical diagram illustrating a router bypass steering the traffic from an ingress classifier of a source VM to a first SF of an SFC in the case where the source VM and the first SF are on different subnetworks in accordance with some embodiments. An application scenario in FIG. 7 is similar to that in the embodiment shown in FIG. 6 except that source VM and the first SF are hosted on different compute nodes in FIG. 7. The following describes an interaction process in detail.

(1) A source VM 702 which needs to send traffic to a destination VM via service functions SF 704. A packet from the source VM 702 reaches an OVS integration bridge 710 of the first subnetwork 706. Destination MAC address of the packet includes MAC-VR1, and destination IP address of the packet includes 1.1.3.10.

(2) The OVS integration bridge 710 receives the packet. The OVS integration bridge 710 queries a locally stored OVS rule, and gets the knowledge that the packet has to transit a service function 704. The OVS rules are obtained from an OVS agent. The OVS integration bridge 710 changes, destination MAC (DestMAC) from MAC-VR1 to MAC-SF, VNI from 10 to 20, and source MAC from MAC-SRC to MAC-VR2. Then the OVS integration bridge 710 sends the changed packet to an OVS tunnel bridge 712 of the first subnetwork.

(3) The OVS tunnel bridge 712 sends the changed packet using VxLAN encapsulation of the IP packet to an OVS Tunnel bridge 714 of the second subnetwork 706 directly to by-pass a virtual router 718.

(4) The OVS tunnel bridge 714 sends the changed packet to the service function 704 via an OVS integration bridge 716 of the second subnetwork.

(5) The service function 704 receives the changed packet and performs the function on it. The service function 704 then sends a packet back to the OVS integration bridge 716.

(6) The OVS integration bridge 716 then sends the packet to the destination VM. Since there is no more service function in the path, the OVS integration bridge 716 sends the packet to the virtual router 718 residing in the network node. The virtual router 718 then routes the packets to the destination VM. If there is other service function in the service function chain, the OVS integration bridge 716 sends the packet to another service function.

A process in which destination VM sends an IP packet to source VM is similar to the foregoing process, and is not described in detail again.

In accordance with some embodiments, a network system includes a first subnetwork having a first service function (SF) in a service function chain (SFC), a second subnetwork having a next SF in the SFC; and a virtual switch integration bridge connected to the first subnetwork and to the second subnetwork. The virtual switch integration bridge is configured to receive a packet from the first SF and determine the next SF in the SFC, send the received packet directly to the next SF in accordance with one or more switch rules.

Figure 8:
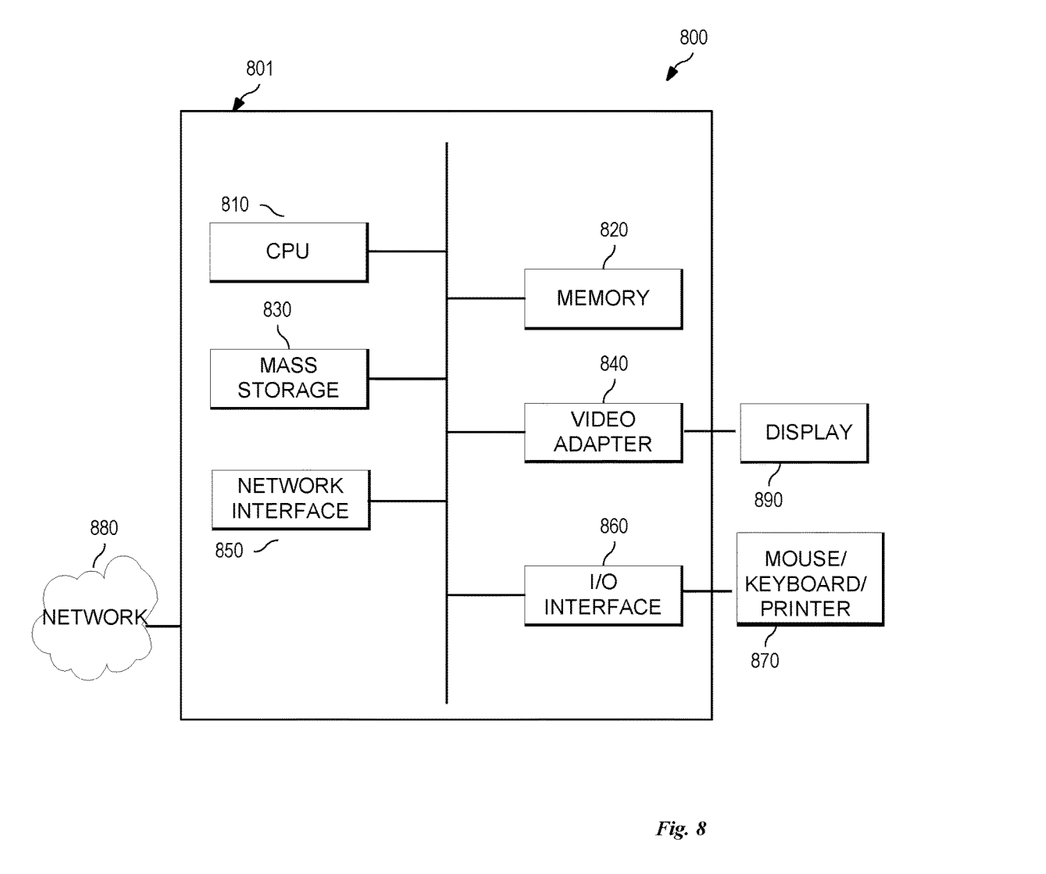
FIG. 8 is a block diagram of a processing system 800 that can be used to implement various embodiments.

FIG. 8 is a block diagram of a processing system 800 that can be used to implement various embodiments. The processing system 800 can be part of a server, router, computer, base station, network controller, or other network device. Additionally, the processing system can host one or more of the described elements. For example, an OVS integration bridge and OVS agent may be deployed on a same processing system 800, or an integration bridge and OVS agent may be on separate processing systems 800 or each may be spread across multiple processing systems 800. Specific devices utilize all of the components shown, or only a subset of the components, and levels of integration will vary from device to device. Furthermore, a device may contain multiple instances of a component, such as multiple processing units, processors, memories, transmitters, receivers, etc. In some embodiments, the processing system 800 has a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus is one or more of any type of several bus architectures including a memory bus or memory controller, a peripheral bus, a video bus, or the like.

The CPU 810 may have any type of electronic data processor. The memory 820 may have, or be, any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 includes any type of storage device that stores data, programs, and other information and to make the data, programs, and other information accessible via the bus. The mass storage device 830 includes, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which includes wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

In some embodiments, an OVS integration bridge may bypass virtual routers when the service functions of a service chain are deployed on separate subnetworks. In such an embodiment, traffic passing between service functions on different subnetworks will not transit a virtual router. Using the OVS integration bridge, service chain traffic can bypass the virtual router and be sent directly from one SF to a next SF, or be sent directly from a VM to an SF. Thus, the OVS integration bridge avoids having to add complex SFC steering functionality on the virtual routers, increases traffic throughput for service chains, decreases traffic latency through service chains, avoids bottlenecks at the nodes that host the virtual routers, and effectively distributes traffic load to multiple nodes in the network rather than on a single node.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A network device, comprising:
one or more processors; and
a non-transitory computer readable medium connected to the one or more processor and having stored thereon instructions that, when executed by the one or more processors, cause the network device to:
track ports connected to a virtual switch integration bridge;
add a switch rule to the virtual switch integration bridge;
receive a packet at the virtual switch integration bridge from a service function (SF) that is in a service function chain (SFC) and that is on a first subnetwork;
determine a next SF in the SFC, wherein the next SF is on a second subnetwork;
change at the virtual switch integration bridge, according to the switch rule, a source MAC address of the packet to a MAC address of an interface of a virtual router on the second subnetwork, a destination media access control (MAC) address of the packet to a MAC address of the next SF, and a virtual network identifier (VNI) of the first subnetwork in the packet to a VNI of the second subnetwork, wherein the switch rule is used to instruct the virtual switch integration bridge to change a source MAC address of the packet to a MAC address of an interface of a virtual router on the second subnetwork; and
send the changed packet directly from the virtual switch integration bridge to the next SF.

2. The network device of claim 1, wherein the non-transitory computer readable medium further has stored thereon instructions that, when executed by the one or more processors, cause the network device to:
steer traffic to an initial SF in the SFC when a source virtual machine of the packet and the initial SF in the SFC are on different subnetworks.

3. The network device of claim 1, wherein the SF and the next SF are hosted on a same compute node or different compute nodes.

4. The network device of claim 1, wherein the SF and the next SF are hosted on different compute nodes, and wherein the non-transitory computer readable medium further has stored thereon instructions that, when executed by the one or more processors, cause the network device to:
send the changed packet from the virtual switch integration bridge to a virtual switch tunnel bridge of the first subnetwork;
send the changed packet from the virtual switch tunnel bridge of the first subnetwork to a virtual switch tunnel of the second subnetwork by using VxLAN encapsulation; and
send the changed packet from the virtual switch tunnel of the second subnetwork to the next SF.

5. A network device, comprising:
one or more processors; and
a non-transitory computer readable medium connected to the one or more processor and having stored thereon instructions that, when executed by the one or more processors, cause the network device to:
track ports connected to a virtual switch integration bridge;
add a switch rule to the virtual switch integration bridge;
receive a packet at the virtual switch integration bridge from a source virtual machine (VM) that is on a first subnetwork;
determine a service function (SF) that is on a second subnetwork;

change at the virtual switch integration bridge, according to a switch rule, a source MAC address of the packet to a MAC address of an interface of a virtual router on the second subnetwork, a destination media access control (MAC) address of the packet to a MAC address of the SF, and a virtual network identifier (VNI) of the first subnetwork in the packet to a VNI of the second subnetwork, wherein the switch rule is used to instruct the virtual switch integration bridge to steer the changed packet from an egress port of the source VM to an ingress port of the SF; and send the changed packet directly from the virtual switch integration bridge to the SF.

6. The network device of claim 5, wherein the source VM and the SF are hosted on different compute nodes, and wherein the non-transitory computer readable medium further has stored thereon instructions that, when executed by the one or more processors, cause the network device to:

send the changed packet from the virtual switch integration bridge to a virtual switch tunnel bridge of the first subnetwork;

send the changed packet from the virtual switch tunnel bridge of the first subnetwork to a virtual switch tunnel of the second subnetwork by using VxLAN encapsulation; and send the changed packet from the virtual switch tunnel of the second subnetwork to the SF.

7. A method, comprising:

tracking ports connected to a virtual switch integration bridge;

adding a switch rule to the virtual switch integration bridge;

receiving a packet at the virtual switch integration bridge from a first service function (SF) that is in a service function chain (SFC) and that is on a first subnetwork;

determining a next SF in the SFC, wherein the next SF is on a second subnetwork;

changing at the virtual switch integration bridge, according to the switch rule, a source MAC address of the packet to a MAC address of an interface of a virtual router on the second subnetwork, a destination media access control (MAC) address of the packet to a MAC address of the next SF, and a virtual network identifier (VNI) of the first subnetwork in the packet to a VNI of the second subnetwork, wherein the switch rule is used to instruct the virtual switch integration bridge to change a source MAC address of the packet to a MAC address of an interface of a virtual router on the second subnetwork; and sending the changed packets directly from the virtual switch integration bridge to the next SF.

8. The method of claim 7, further comprising:

steering to an initial SF in the SFC when a source virtual machine and the initial SF in the SFC are on different subnetworks.

9. The method of claim 7, further comprising:

send the changed packet from the virtual switch integration bridge to a virtual switch tunnel bridge of the first subnetwork;

send the changed packet from the virtual switch tunnel bridge of the first subnetwork to a virtual switch tunnel of the second subnetwork by using VxLAN encapsulation; and send the changed packet from the virtual switch tunnel of the second subnetwork to the next SF.

10. A method, comprising:

tracking ports connected to a virtual switch integration bridge;

adding a switch rule to the virtual switch integration bridge;

receiving a packet at the virtual switch integration bridge from a source virtual machine (VM) that is on a first subnetwork;

determining a service function (SF) that is on a second subnetwork;

changing at the virtual switch integration bridge, according to a switch rule, a source MAC address of the packet to a MAC address of an interface of a virtual router on the second subnetwork, a destination media access control (MAC) address of the packet to a MAC address of the SF, and a virtual network identifier (VNI) of the first subnetwork in the packet to a VNI of the second subnetwork, wherein the switch rule is used to instruct the virtual switch integration bridge to steer the changed packet from an egress port of the source VM to an ingress port of the SF; and sending the changed packet directly from the virtual switch integration bridge to the SF.

11. The method of claim 10, wherein the source VM and the SF are hosted on different compute nodes or a same compute node.

12. The method of claim 11, when the source VM and the SF are hosted on different compute nodes, the method further comprises:

sending the changed packet from the virtual switch integration bridge to a virtual switch tunnel bridge of the first subnetwork;

sending the changed packet from the virtual switch tunnel bridge of the first subnetwork to a virtual switch tunnel of the second subnetwork by using VxLAN encapsulation; and sending the changed packet from the virtual switch tunnel of the second subnetwork to the SF.

* * * * *